United States Patent
Song

(10) Patent No.: US 9,346,516 B2
(45) Date of Patent: May 24, 2016

(54) ELECTRIC BICYCLE AND CONTROL METHOD THEREOF

(71) Applicant: MANDO CORPORATION, Pyeongtaek-si (KR)

(72) Inventor: Joon-Kyu Song, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/535,314

(22) Filed: Nov. 6, 2014

(65) Prior Publication Data

US 2015/0142241 A1      May 21, 2015

(30) Foreign Application Priority Data

Nov. 15, 2013   (KR) .................. 10-2013-0139351

(51) Int. Cl.
*B62M 6/50*       (2010.01)
*B62M 6/45*       (2010.01)
(Continued)

(52) U.S. Cl.
CPC . *B62M 6/50* (2013.01); *B62M 6/45* (2013.01); *B62M 6/65* (2013.01); *B62M 9/00* (2013.01)

(58) Field of Classification Search
CPC ............. B62M 6/50; B62M 6/45; B62M 6/65
See application file for complete search history.

(56) References Cited

U.S. PATENT DOCUMENTS

| | | | |
|---|---|---|---|
| 8,302,982 B2 | 11/2012 | Bastianen | |
| 2010/0264622 A1* | 10/2010 | Bastianen | ................. 280/281.1 |
| 2012/0202649 A1 | 8/2012 | Huber | |

FOREIGN PATENT DOCUMENTS

| | | |
|---|---|---|
| DE | 298 17 404 | 1/1999 |
| EP | 0 728 663 | 8/1996 |
| EP | 0 976 649 | 2/2000 |

(Continued)

OTHER PUBLICATIONS

Office Action dated Mar. 16, 2016 for Korean Patent Application No. 10-2013-0139351.

(Continued)

*Primary Examiner* — Fadey Jabr
*Assistant Examiner* — Basil T Jos
(74) *Attorney, Agent, or Firm* — Ladas & Parry, LLP

(57) ABSTRACT

Disclosed herein are an electric bicycle and a control method thereof. The electric bicycle includes a hub motor including a motor housing configured to rotate with a wheel, a sprocket connected to a chain so as to rotate by receiving rider pedaling force through the chain, a first speed detector to detect a speed of the hub motor, a second speed detector to detect a speed of the sprocket, a motor driving unit to drive the hub motor, and an electronic control unit to compare the speed of the hub motor with the speed of the sprocket and control the motor driving unit to perform speed control of the hub motor according to a comparison result, wherein the second speed detector includes a magnet provided at the motor housing and disposed adjacent to teeth formed at an outer peripheral surface of the sprocket, a magnetic substance disposed apart from the magnet at a distance corresponding to a gap between the teeth of the sprocket or more gaps, a magnetic substance assembly connected with the magnetic substance and configured to rotate with the motor housing when the motor housing rotates, a PCB substrate fixed to a shaft of the hub motor, and a hall sensor provided at the PCB substrate in order to detect a change of a magnetic field of the magnetic substance assembly.

10 Claims, 9 Drawing Sheets

(51) Int. Cl.
*B62M 6/65* (2010.01)
*B62M 9/00* (2006.01)

(56) References Cited

FOREIGN PATENT DOCUMENTS

| | | |
|---|---|---|
| JP | 8-207876 | 8/1996 |
| JP | 9-39875 | 2/1997 |
| JP | 9-249185 | 9/1997 |
| JP | 2002-321683 | 11/2002 |
| JP | 2011-143752 | 7/2011 |
| JP | 5202769 | 2/2013 |
| KR | 10-0913501 | 8/2009 |
| TW | 307945 | 6/1997 |
| WO | 2012/104810 | 8/2012 |
| WO | 2012/105198 | 8/2012 |
| WO | 2013/160477 | 10/2013 |

OTHER PUBLICATIONS

Extended European Search Report dated Apr. 2, 2015 for European Patent Application No. 14176327.6.
Notice of Allowance dated Jun. 16, 2015 for Korean Patent Application No. 10-2013-0139351 and its English summary provided by Applicant's foreign counsel.
Office Action dated Jan. 26, 2016 for Taiwanese Patent Application No. 103128905.

* cited by examiner

ELECTRIC BICYCLE AND CONTROL METHOD THEREOF

CROSS-REFERENCE TO RELATED APPLICATION

This application claims the benefit of Korean Patent Application No. 2013-0139351, filed on Nov. 15, 2013 in the Korean Intellectual Property Office, the disclosure of which is incorporated herein by reference.

BACKGROUND

1. Field

Embodiments of the present invention relate to an electric bicycle and a control method thereof, which has a foldable structure for convenience of storage and carriage.

2. Description of the Related Art

In general, an electric bicycle includes a hub motor mounted to a wheel to rotate the same and a battery to supply power to the hub motor. An electric bicycle runs by rotation of a wheel driven by a hub motor.

Such a hub motor includes a motor housing connected to a wheel by spokes. Rotational force generated by a rotor and a stator in the motor housing rotates the wheel together with the motor housing. A sprocket, which is connected to pedals by a chain, is mounted outside the motor housing. When a rider pedals, rotational force is transmitted to the sprocket through the chain. Accordingly, a rider may ride a bicycle by his/her pedaling force.

When riding an electric bicycle, if a rider rotates an acceleration device (throttle) provided at a handle unit, a hub motor is activated and a wheel rotates by rotational force from the hub motor.

A torque of the hub motor may be adjusted by a rotation degree of the throttle.

However, because a rider should rotate the throttle in order to adjust a torque of the hub motor, there is inconvenience that the throttle switch should be installed to the handle unit so that a rider can manually operate the same.

SUMMARY

It is an aspect of the present invention to provide an electric bicycle and a control method thereof capable of performing speed control using a speed of a hub motor and a speed of a free wheel that is a device configured to help a wheel to rotate even though rotation of pedals is stopped.

It is another aspect of the present invention to provide an electric bicycle and a control method thereof capable of performing brake control using a speed of the hub motor and a speed of the free wheel.

Additional aspects of the invention will be set forth in part in the description which follows and, in part, will be obvious from the description, or may be learned by practice of the invention.

In accordance with one aspect of the present invention, an electric bicycle includes a hub motor including a motor housing configured to rotate with a wheel, a sprocket connected to a chain so as to rotate by receiving rider pedaling force through the chain, a first speed detector to detect a speed of the hub motor, a second speed detector to detect a speed of the sprocket, a motor driving unit to drive the hub motor, and an electronic control unit to compare the speed of the hub motor with the speed of the sprocket and control the motor driving unit to perform speed control of the hub motor according to a comparison result, wherein the second speed detector includes a magnet provided at the motor housing and disposed adjacent to teeth formed at an outer peripheral surface of the sprocket, a magnetic substance disposed apart from the magnet at a distance corresponding to a gap between the teeth of the sprocket or more gaps, a magnetic substance assembly connected with the magnetic substance and configured to rotate with the motor housing when the motor housing rotates, a PCB substrate fixed to a shaft of the hub motor, and a hall sensor provided at the PCB substrate in order to detect a change of a magnetic field of the magnetic substance assembly.

If the speed of the hub motor and the speed of the sprocket are the same, the electronic control unit may perform power assist system (PAS) control to assist rotational force of the hub motor.

If the speed of the hub motor exceeds the speed of the sprocket, the electronic control unit may perform cruise control to keep the speed of the hub motor in a present speed.

The electric bicycle may further include a brake unit to brake the hub motor. The electronic control unit may determine whether the sprocket rotates in the opposite direction to the hub motor based upon the speed of the sprocket, and upon determining that the sprocket rotates in the opposite direction to the hub motor, the electronic control unit may control the brake unit to brake the hub motor.

The hall sensor may detect a rotating speed of the sprocket by detecting a change of a magnetic field of the magnetic substance assembly to which a magnetic field formed at the magnet and the magnetic substance is transmitted when the teeth of the sprocket rotate.

If the speed of the sprocket detected through the hall sensor exceeds a preset speed within which the sprocket rotates in the same direction as the hub motor, the electronic control unit may determine that the sprocket rotates in the opposite direction to the hub motor.

In accordance with another aspect of the present invention, a control method of an electric bicycle including a hub motor including a motor housing configured to rotate with a wheel and a sprocket connected to a chain so as to rotate by receiving rider pedaling force through the chain, includes detecting a speed of the hub motor, detecting a speed of the sprocket, comparing the speed of the hub motor with the speed of the sprocket, and performing speed control of the hub motor according to a comparison result.

The performing speed control of the hub motor may include, if the speed of the hub motor and the speed of the sprocket are the same, performing power assist system (PAS) control to assist rotational force of the hub motor.

The performing speed control of the hub motor may include, if the speed of the hub motor exceeds the speed of the sprocket, performing cruise control to keep the speed of the hub motor in a present speed.

The control method may further include determining whether the sprocket rotates in the opposite direction to the hub motor based upon the speed of the sprocket, and upon determining that the sprocket rotates in the opposite direction to the hub motor, braking the hub motor.

The determining whether the sprocket rotates in the opposite direction to the hub motor may include, if the speed of the sprocket exceeds a preset speed within which the sprocket rotates in the same direction as the hub motor, determining that the sprocket rotates in the opposite direction to the hub motor.

As described above, the speed control of the electric bicycle is performed using the speed of the hub motor and the speed of the free wheel. Accordingly, it is not necessary to install a throttle switch and a wiring structure for throttle switch connection is eliminated. As a result, the structure of the electric bicycle is simplified.

In addition, since torque adjustment of the hub motor is achieved by adjusting a pedaling speed, riding safety is more enhanced than a conventional electric bicycle having a throttle switch which a rider should manually operate.

In addition, since brake control is achieved by pedaling in reverse, riding safety is much more enhanced than a conventional electric bicycle having a brake lever which a rider should manually operate.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
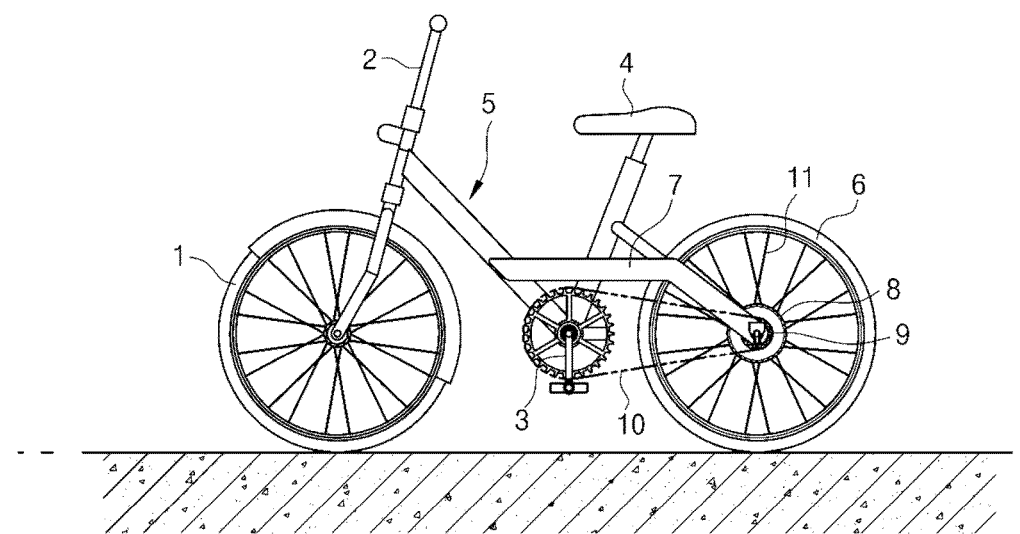
FIG. 1 is a view illustrating an electric bicycle according to an embodiment of the present invention.

Now, preferred embodiments of the present invention will be described in detail with reference to the annexed drawings. The preferred embodiments described in the following specification and shown in the accompanying drawings are illustrative only and are not intended to represent all aspects of the invention, so that it is to be understood that various equivalents and modifications can be made without departing from the spirit of the invention. In the drawings, elements unrelated to the embodiments of the present invention are omitted from depiction for clarity, and the component's width, length, thickness, etc. are exaggerated for convenience. Like numbers refer to like elements throughout the description of the figures.

FIG. 1 is a view illustrating an electric bicycle according to an embodiment of the present invention.

Referring to FIG. 1, an electric bicycle comprises a first frame 5 provided with a front wheel 1, a handle unit 2, a pedal 3 and a saddle 4, and a second frame 7 provided with a rear wheel 6.

The first frame 5 is formed in a bar shape having a space therein. The handle unit 2 is disposed at an end portion of the first frame 5.

The handle unit 2 includes a rotatable handle stem, a handle bar and a brake lever to brake the front wheel 1 and the rear wheel 6. A display device may be removably mounted to a portion of the handle unit 2. Information, such as a speed, a battery capacity or the like, may be displayed through the display device.

An electronic control unit may be provided inside the first frame 5. The electronic control unit is in charge of electrical connection between a battery and other components and operation control thereof. The battery and the electronic control unit may also be mounted to the second frame 7.

The rear wheel 6 is coupled to a portion of the second frame 7.

The rear wheel 6 is mounted with a hub motor 8. The hub motor 8 receives power from the battery and rotates the rear wheel 6.

The hub motor 8 includes a motor housing connected to the rear wheel 6 by spokes 11. Rotational force generated by a rotor and a stator in the motor housing rotates the rear wheel 6 together with the motor housing.

A free wheel, that is, a sprocket 9 having a one-way clutch, is provided at a portion of the hub motor 8. The sprocket 9 is connected with a chain 10 through which pedaling force is transmitted to the sprocket 9. The sprocket 9 is disposed outside the motor housing of the hub motor 8. A rider may ride an electric bicycle using his/her pedaling force because the sprocket 9 receives rotational force caused by rider pedaling force through the chain 10.

The sprocket 9 is connected to the hub motor 8 via the one-way clutch. If the chain 10 rotates in one direction, the sprocket 9 also rotates in one direction with the chain 10 and rotational force of the sprocket 9 is transmitted to the hub motor 8. However, if the chain 10 rotates in reverse, the sprocket 9 also rotates in reverse but rotational force of the sprocket 9 is prohibited from being transmitted to the hub motor 8.

Although detailed description about the front wheel 1 and the rear wheel 6 has not been made, the front and rear wheels 1 and 6 may be provided with discs and friction pads as a brake device to diminish rotational force when the brake lever operates.

Figure 2:
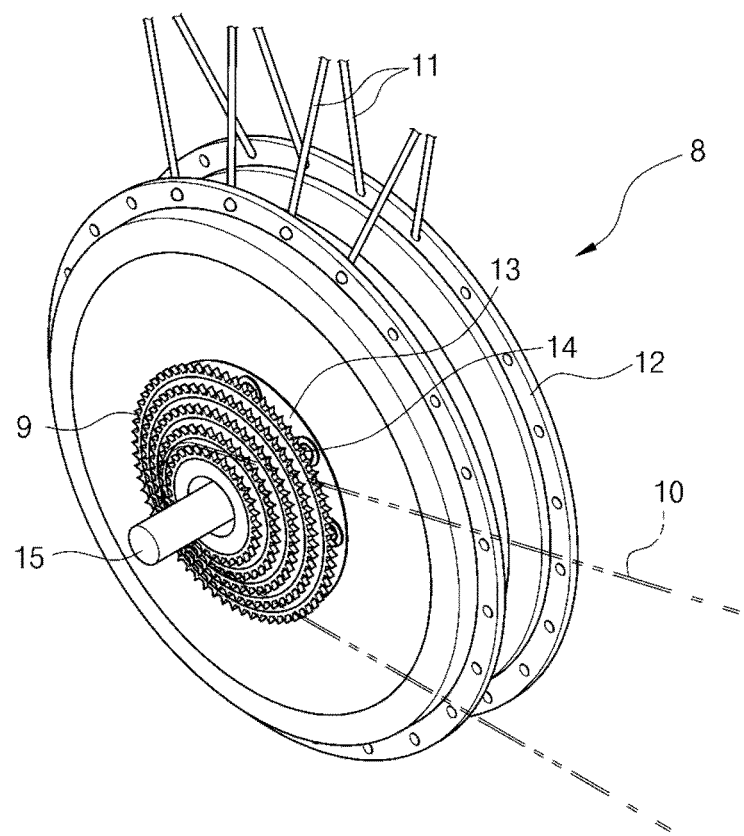
FIG. 2 is a perspective view illustrating a hub motor of the electric bicycle according to an embodiment of the present invention.
Figure 3:
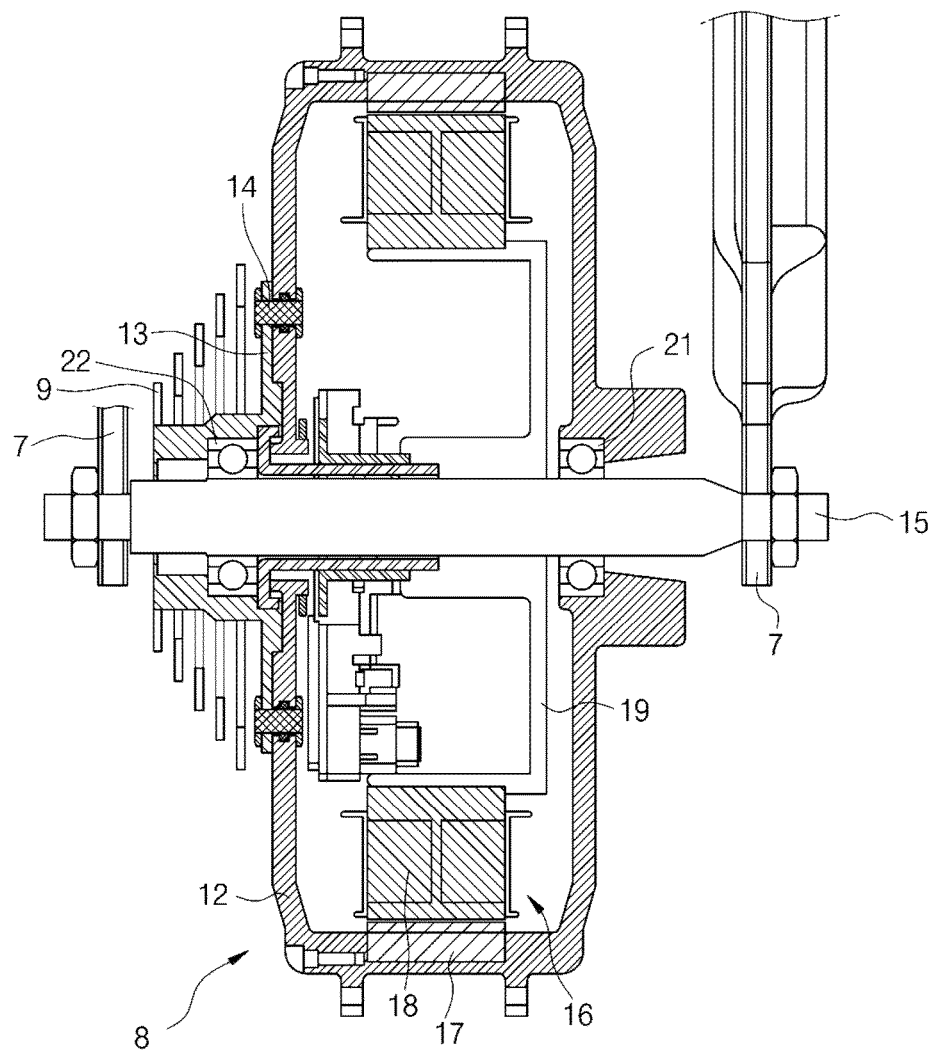
FIG. 3 is a sectional view schematically illustrating the hub motor of the electric bicycle according to an embodiment of the present invention.

FIG. 2 is a perspective view illustrating the hub motor of the electric bicycle according to an embodiment of the present invention, and FIG. 3 is a sectional view schematically illustrating the hub motor of the electric bicycle according to an embodiment of the present invention.

Referring to FIGS. 2 and 3, the hub motor 8 is installed to a shaft 15 mounted to the second frame 7. In detail, the hub motor 8 includes a first body 12 rotatably mounted to the shaft 15 of the rear wheel 6 and a second body 14 engaged with the first body 12 by fixing pins 13.

The first body 12 has a space therein and is rotatably mounted to the shaft 15. The shaft 15 penetrates a center of the first body 12, and both end portions of the shaft 15 are fixed to the second frame 7. An outer peripheral surface of the first body 12 is connected to the rear wheel 6 via the spokes 11. A motor unit 16 is provided in the second body 12. The motor unit 16 is configured to generate rotational force to drive the rear wheel 6.

The second body 14 is rotatably mounted to the shaft 15 and engaged with the first body 12. The second body 14 is assembled with one side surface of the first body 12 and has a through-hole at a center thereof through which the shaft 15 is inserted. The second body 14 is provided with the sprocket 9 connected to the chain 10 through which pedaling force is transmitted to the sprocket 9. Accordingly, the second body 14 rotates by receiving pedaling force through the sprocket 9 connected to the chain 10.

The first body 12 and the second body 14 engaged with each other define the motor housing. That is, the motor housing rotates together with the rear wheel 6 by rotational force generated from the motor unit 16.

The motor unit 16 may be a motor which is commonly used. The motor unit 16 includes a stator 18 which is fixed to the shaft 15 by a connecting plate 19 and has a ring shape around which a coil is wound, and a rotor 17 which is spaced apart from the stator 18 and mounted to an inner peripheral surface of the first body 12. A plurality of magnets is mounted to the rotor 17. If power is applied to the coil of the stator 18, repulsive and attractive forces are generated between the magnets and the coil, thereby rotating the rotor 17. As the rotor 17 rotates, the first body 12 and the second body 14 coupled thereto also rotate together with the rear wheel 6. In order to facilitate rotation of the first body 12 and the second body 14, bearings 21 and 22 are provided between each of the bodies 12 and 14 and the shaft 15.

Figure 4:
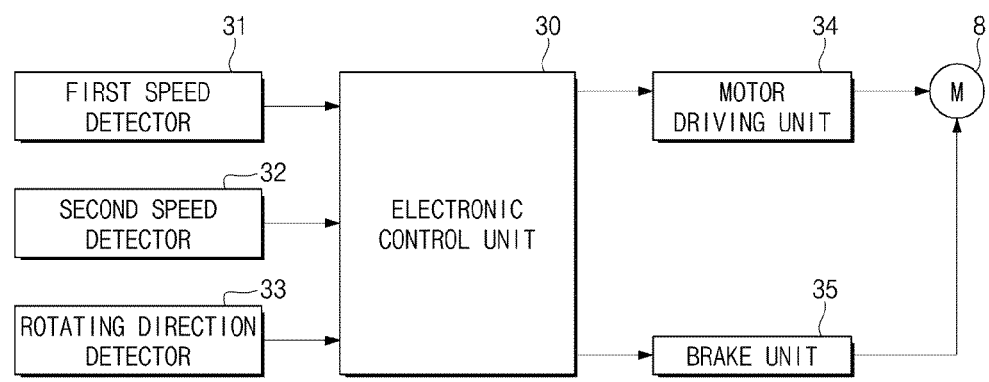
FIG. 4 is a control block diagram of the electric bicycle according to an embodiment of the present invention.

FIG. 4 is a control block diagram of the electric bicycle according to an embodiment of the present invention.

Referring to FIG. 4, the electric bicycle further comprises an electronic control unit 30 to perform overall control thereof.

A first speed detector 31, a second speed detector 32 and a rotating direction detector 33 are electrically connected to an input terminal of the electronic control unit 30.

A motor driving unit 34 and a brake unit 35 are electrically connected to an output terminal of the electronic control unit 30.

The first speed detector 31 is configured to detect a rotating speed of the hub motor 8. The first speed detector 31 may include a hall sensor which is provided in the motor housing of the hub motor 8 and detects rotation of the rotor 17.

The second speed detector 32 is configured to detect a rotating speed of the sprocket 9 by, for example, detecting a plurality of teeth formed along an outer peripheral surface of the sprocket 9.

The rotating direction detector 33 is configured to detect a rotating direction of the sprocket 9. In detail, the rotating direction detector 33 detects whether the sprocket 9 rotates in the same direction as the hub motor 8 or in the opposite direction to the hub motor 8. For convenience of explanation, the same rotating direction as the hub motor 8 is indicated by a positive sign "+", and the opposite rotating direction to the hub motor 8 is indicated by a negative sign "−". For example, a rotating speed of the sprocket 9 when rotating in the same direction as the hub motor 8 is represented by Vs (or +Vs), and a rotating speed of the sprocket 9 when rotating in the opposite direction to the hub motor 8 is represented by −Vs.

The motor driving unit 34 is configured to drive the hub motor 8. The motor driving unit 34 adjusts a rotating speed of the hub motor 8 according to a control signal of the electronic control unit 30.

The brake unit 35 is configured to brake the hub motor 8. For example, in order to brake the hub motor 8, the brake unit 35 short-circuits a power input terminal of the hub motor 8 according to a control signal of the electronic control unit 30. To achieve this, the brake unit 35 includes a switch that is turned on or off according to a control signal of the electronic control unit 30. The switch is connected in parallel with the power input terminal of the hub motor 8. The brake unit 35 may brake the hub motor 8 by supplying power to charge a battery.

The electronic control unit 30 compares a speed Vm of the hub motor 8 detected through the first speed detector 31 when starting the electric bicycle with a speed Vs of the sprocket detected through the second speed detector 32 when starting the electric bicycle. If the speed Vm of the hub motor 8 and the speed Vs of the sprocket are the same, the electronic control unit 30 performs power assist system (PAS) control to rotate the hub motor 8 corresponding to the speed Vs of the sprocket so that the hub motor 8 rotates corresponding to rider pedaling force. Accordingly, even when a rider pedals with a relatively small force, the electric bicycle runs at a relatively high speed.

During the PAS control performance, if the speed Vm of the hub motor 8 exceeds the speed Vs of the sprocket, the electronic control unit 30 performs cruise control to keep the speed of the hub motor 8 in a present speed through the motor driving unit 34.

During the PAS control or cruise control performance, if the speed Vs of the sprocket is less than 0, the electronic control unit 30 determines that the sprocket 9 rotates in the opposite direction to the hub motor 8. Based upon this determination result, the electronic control unit 30 determines that a rider wants to brake the electric bicycle, and brakes the hub motor 8 through the brake unit 35. At this time, the electronic control unit 30 brakes the hub motor 8 by short-circuiting the power input terminal of the hub motor 8.

Figure 5:
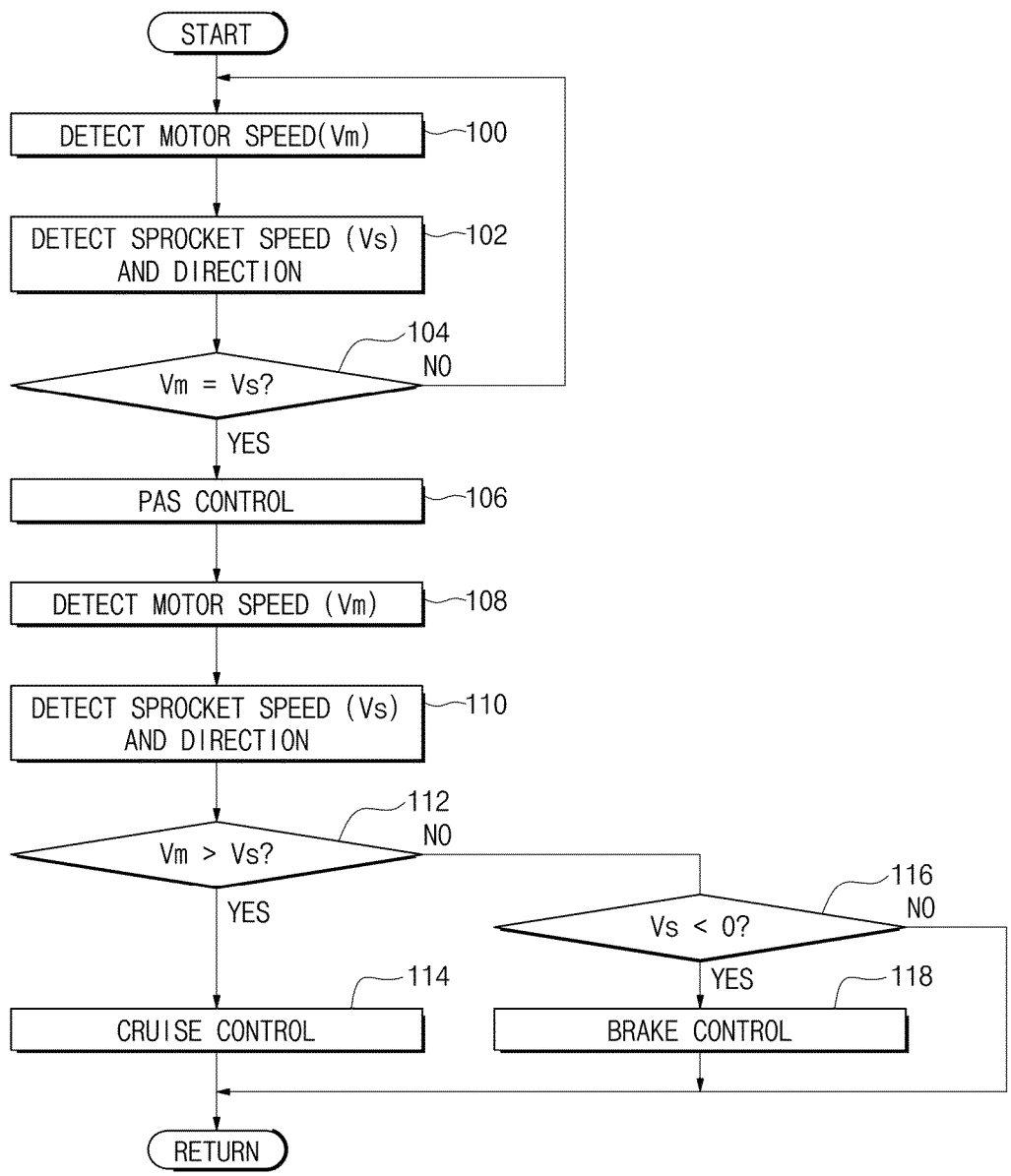
FIG. 5 is a control flowchart of a control method of the electric bicycle according to an embodiment of the present invention.

FIG. 5 is a control flowchart of a control method of the electric bicycle according to an embodiment of the present invention.

Referring to FIG. 5, when starting the electric bicycle, the speed Vm of the hub motor 8 is detected through the first speed detector 31 at operation 100, and the rotating direction and the speed Vs of the sprocket 9 are detected through the second speed detector 32 and the rotating direction detector 33 at operation 102.

The electronic control unit 30 compares the speed Vm of the hub motor 8 with the speed Vs of the sprocket and determines whether the speed Vm of the hub motor 8 is the same as the speed Vs of the sprocket at operation 104.

From the determination result of operation 104, if the speed Vm of the hub motor 8 is not the same as the speed Vs of the sprocket, this process goes back to operation 100.

On the other hand, from the determination result of operation 104, if the speed Vm of the hub motor 8 is the same as the speed Vs of the sprocket, the electronic control unit 30 performs PAS control to assist rotational force of the hub motor 8 at operation 106. Accordingly, even when a rider pedals with a relatively small force, the electric bicycle runs at a relatively high speed.

During the PAS control performance, the speed Vm of the hub motor 8 is detected through the first speed detector 31 at operation 108, and the rotating direction and the speed Vs of the sprocket 9 are detected through the second speed detector 32 and the rotating direction detector 33 at operation 110.

The electronic control unit 30 compares the speed Vm of the hub motor 8 with the speed Vs of the sprocket and determines whether the speed Vm of the hub motor 8 exceeds the speed Vs of the sprocket at operation 112.

From the determination result of operation 112, if the speed Vm of the hub motor 8 does not exceed the speed Vs of the sprocket, the electronic control unit 30 determines whether the speed Vs of the sprocket is less than 0 at operation 116.

From the determination result of operation 116, if the speed Vs of the sprocket is less than 0, it means that the sprocket 9 rotates in the opposite direction to the hub motor 8. Accordingly, the electronic control unit 30 determines that a rider wants to brake the electric bicycle and performs brake control to brake the hub motor 8 through the brake unit 35 at operation 118.

Hereinafter, another embodiment of detecting the speed and the rotating direction of the sprocket 9 will be explained.

Figure 6:
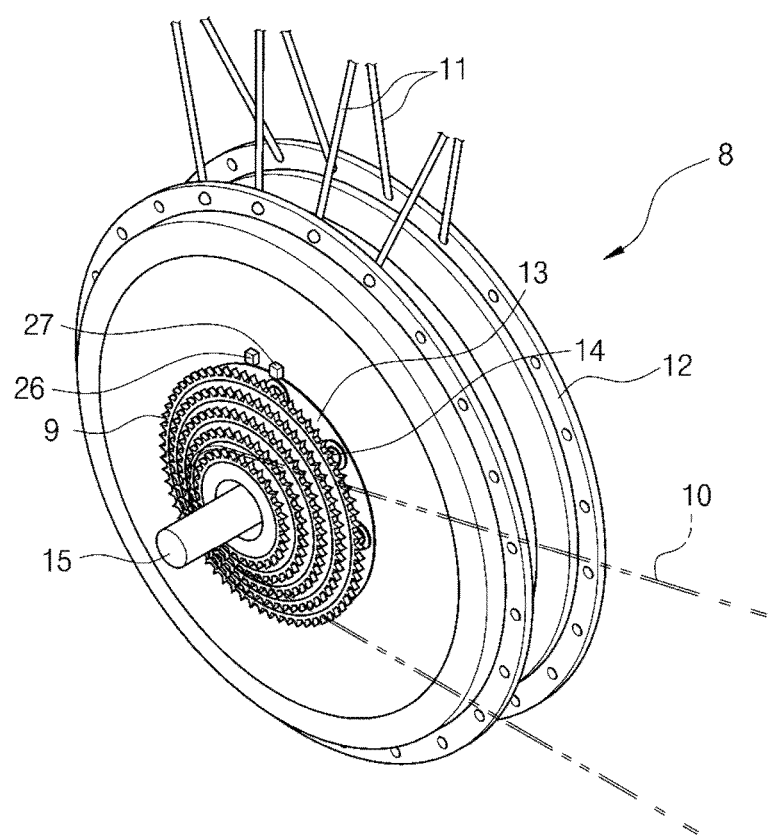
FIG. 6 is a perspective view illustrating a hub motor of an electric bicycle according to another embodiment of the present invention.
Figure 7:
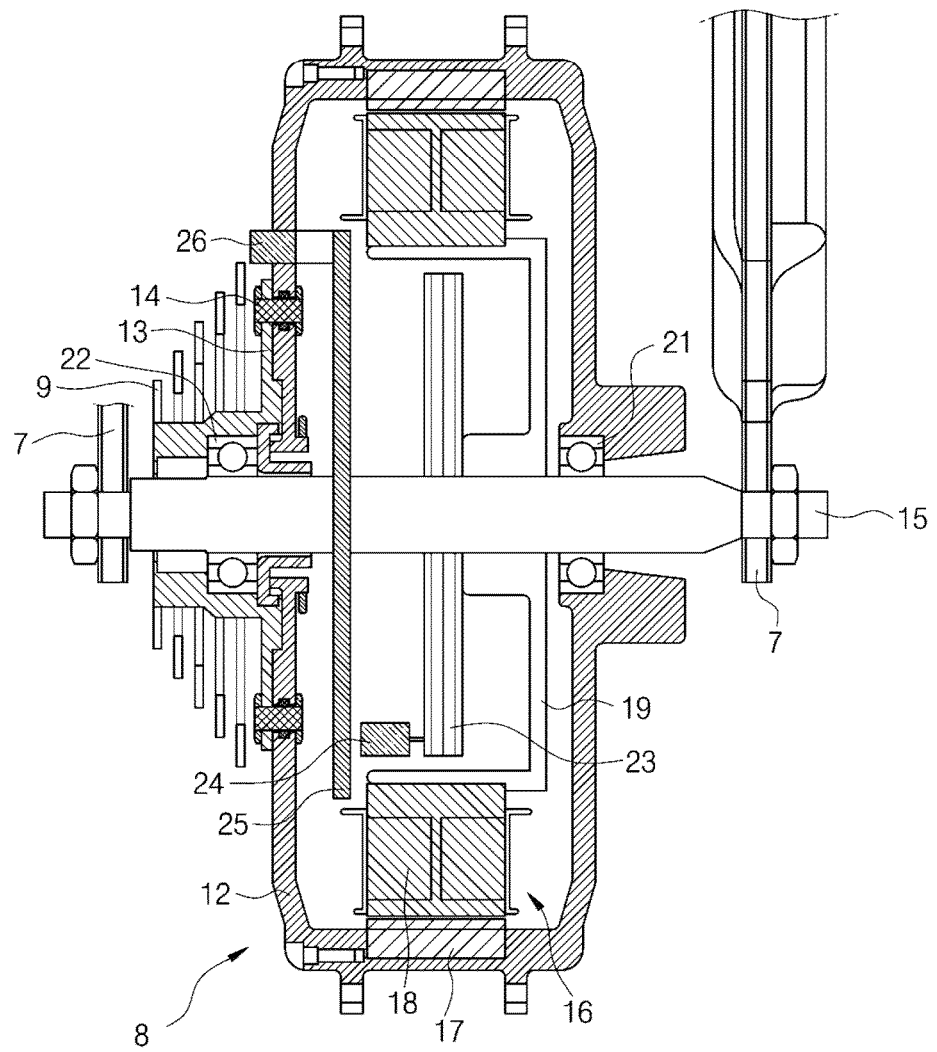
FIG. 7 is a sectional view schematically illustrating the hub motor of the electric bicycle according to another embodiment of the present invention.

FIG. 6 is a perspective view illustrating a hub motor of an electric bicycle according to another embodiment of the present invention, and FIG. 7 is a sectional view schematically illustrating the hub motor of the electric bicycle according to another embodiment of the present invention.

Referring to FIGS. 6 and 7, an electric bicycle according to this embodiment comprises the same constitutional components as the electric bicycle of the previous embodiment, except the hub motor 8. The hub motor 8 of the electric bicycle according to this embodiment includes a PCB substrate 23, a hall sensor 24, a magnetic substance assembly 25, a magnetic substance 26 and a magnet 27.

The PCB substrate 23 is fixed to the shaft 15 so as not to rotate although the motor housing rotates.

The hall sensor 24 is provided at a portion of the PCB substrate 23. The hall sensor 24 protrudes toward the magnetic substance assembly 25.

Figure 8:
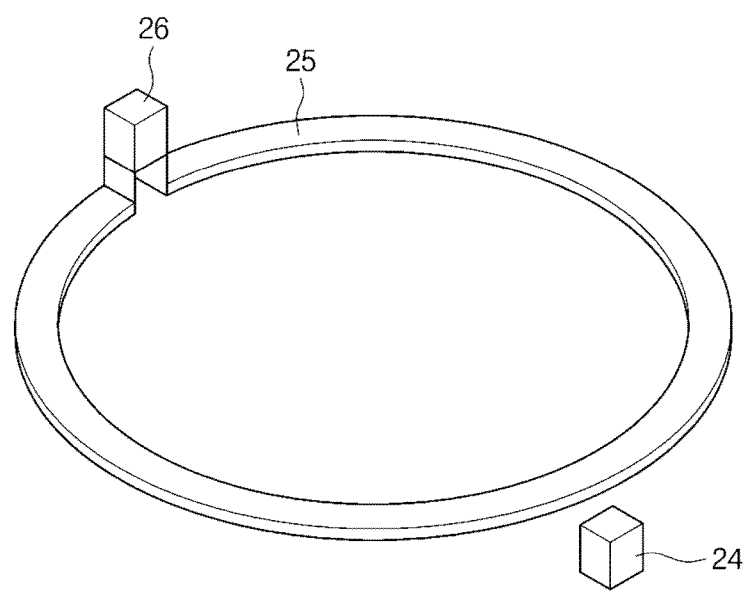
FIG. 8 is a view to explain a magnetic substance assembly provided at the hub motor of the electric bicycle according to another embodiment of the present invention.

The magnetic substance 26 is provided at a portion of the magnetic substance assembly 25. The magnetic substance 26 penetrates the motor housing and is exposed to the outside. The magnetic substance assembly 25 rotates together with the motor housing when the motor housing rotates. The hall sensor 24 provided at the PCB substrate 23 is disposed adjacent to the magnetic substance assembly 25 so as to detect a change of a magnetic field of the magnetic substance assembly 25 (refer to FIG. 8).

The magnetic substance 26 displays magnetic properties by the magnetic field provided from the magnet 27. Further, the magnetic substance 26 transmits the magnetic field provided from the magnet 27 to the magnetic substance assembly 25.

The magnet 27 is disposed adjacent to the magnetic substance 26 and forms a magnetic field around the magnetic substance 26 by interaction with teeth 9a of the sprocket 9. The magnet 27 and the magnetic substance 26 may be disposed apart from each other at a distance corresponding to a gap between the teeth 9a of the sprocket 9 or more gaps. The magnetic field formed around the magnetic substance 26 is transmitted to the magnetic substance assembly 25, and the hall sensor 25 detects the speed of the sprocket 9 by detecting a change of the magnetic field of the magnetic substance assembly 25. In addition, the rotating direction of the sprocket 9 may also be detected in consideration of the speed of the hub motor 8. In detail, if the speed of the sprocket 9 exceeds the speed of the hub motor 8 during rotation of the hub motor 8, it means that the sprocket 9 rotates in the opposite direction to the hub motor 8. By such a process, the rotating direction of the sprocket 9 may be detected. The magnetic substance 26 and the magnet 27 are integrally formed at the motor housing made of a nonmagnetic material and rotate together with the hub motor 8.

The magnetic substance 26 and the magnet 27 make the hall sensor 24 detect the relative movement of the hub motor 8 and the sprocket 9.

Figure 9:
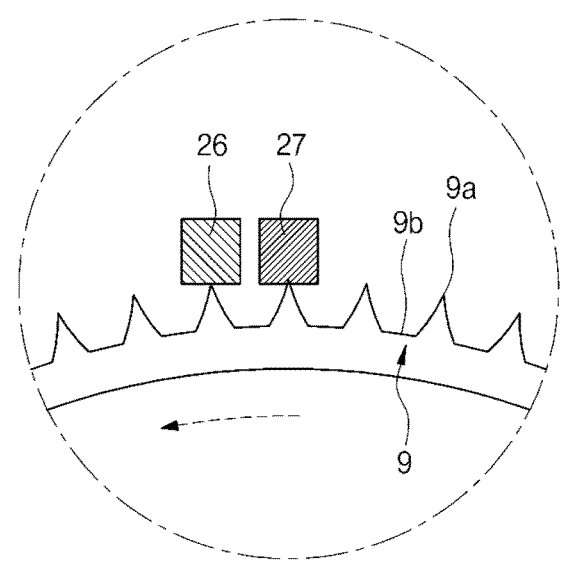
FIG. 9 is a view to explain detection of a rotating speed of a sprocket in the electric bicycle according to another embodiment of the present invention.

FIG. 9 is a view to explain detection of the rotating speed of the sprocket in the electric bicycle according to another embodiment of the present invention.

Referring to FIG. 9, whenever the teeth 9a of the sprocket 9 are respectively positioned corresponding to the magnet 27 and the magnetic substance 26, the magnetic substance 26 is magnetized by the magnet 27. Accordingly, a periodic change of the magnetic field occurs at the magnetic substance assembly 25 and such a change of the magnetic field is detected by the hall sensor 24, thereby detecting the rotating speed of the sprocket 9.

If a rider pedals in reverse, the sprocket 9 rotates in the opposite direction to the hub motor 8. The rotating speed of the sprocket 9 in the opposite direction exceeds a preset speed within which the sprocket 9 rotates in the same direction as the hub motor 8. The change of the magnetic field at this time is detected through the hall sensor 24, thereby detecting that the rotating direction of the sprocket 9 has been changed to the opposite direction.

It has been described that the rotating speed and the rotating direction of the sprocket 9 are used for speed control and brake control of the electric bicycle. However, the rotating speed and the rotating direction of the pedal 3 may also be used instead of the rotating speed and the rotating direction of the sprocket 9.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle comprising:
    a hub motor including a motor housing configured to rotate with a wheel;
    a sprocket connected to a chain so as to rotate by receiving rider pedaling force through the chain;
    a first speed detector to detect a speed of the hub motor;
    a second speed detector to detect a speed of the sprocket;
    a motor driving unit to drive the hub motor; and
    an electronic control unit to compare the speed of the hub motor with the speed of the sprocket and control the motor driving unit to perform speed control of the hub motor according to a comparison result,
    wherein the second speed detector includes:
    a magnet provided at the motor housing and disposed adjacent to teeth formed at an outer peripheral surface of the sprocket;
    a magnetic substance disposed apart from the magnet at a distance corresponding to a gap between the teeth of the sprocket or more gaps;
    a magnetic substance assembly connected with the magnetic substance and configured to rotate with the motor housing when the motor housing rotates;
    a PCB substrate fixed to a shaft of the hub motor so as not to rotate whereas the motor housing is rotatable; and
    a hall sensor provided at the PCB substrate and disposed adjacent to the magnetic substance assembly so as to detect the rotating speed of the sprocket by detecting a change of a magnetic field of the magnetic substance assembly to which a magnetic field formed at the magnet and the magnetic substance is transmitted when the teeth of the sprocket rotate.

2. The electric bicycle according to claim 1, wherein if the speed of the hub motor and the speed of the sprocket are the same, the electronic control unit performs power assist system (PAS) control to assist rotational force of the hub motor.

3. The electric bicycle according to claim 1, wherein if the speed of the hub motor exceeds the speed of the sprocket, the electronic control unit performs cruise control to keep the speed of the hub motor in a present speed.

4. The electric bicycle according to claim 1, further comprising:
    a brake unit to brake the hub motor, wherein the electronic control unit determines whether the sprocket rotates in the opposite direction to the hub motor based upon the speed of the sprocket, and upon determining that the sprocket rotates in the opposite direction to the hub motor, the electronic control unit controls the brake unit to brake the hub motor.

5. The electric bicycle according to claim 1, wherein if the speed of the sprocket detected through the hall sensor exceeds a preset speed within which the sprocket rotates in the same direction as the hub motor, the electronic control unit determines that the sprocket rotates in the opposite direction to the hub motor.

6. A control method of an electric bicycle comprising a hub motor including a motor housing configured to rotate with a wheel and a sprocket connected to a chain so as to rotate by receiving rider pedaling force through the chain, the control method comprising:

detecting a speed of the hub motor;

detecting a speed of the sprocket;

comparing the speed of the hub motor with the speed of the sprocket; and performing speed control of the hub motor according to a comparison result.

7. The control method according to claim 6, wherein the performing speed control of the hub motor includes:

if the speed of the hub motor and the speed of the sprocket are the same, performing power assist system (PAS) control to assist rotational force of the hub motor.

8. The control method according to claim 6, wherein the performing speed control of the hub motor includes:

if the speed of the hub motor exceeds the speed of the sprocket, performing cruise control to keep the speed of the hub motor in a present speed.

9. The control method according to claim 6, further comprising:

determining whether the sprocket rotates in the opposite direction to the hub motor based upon the speed of the sprocket; and upon determining that the sprocket rotates in the opposite direction to the hub motor, braking the hub motor.

10. The control method according to claim 9, wherein the determining whether the sprocket rotates in the opposite direction to the hub motor includes:

if the speed of the sprocket exceeds a preset speed within which the sprocket rotates in the same direction as the hub motor, determining that the sprocket rotates in the opposite direction to the hub motor.

* * * * *